United States Patent [19]
Ligeras

[11] Patent Number: 5,516,189
[45] Date of Patent: May 14, 1996

[54] PORTABLE HEATED SEAT

[76] Inventor: Achilles P. Ligeras, 5 Meadow La., New City, N.Y. 10956

[21] Appl. No.: 337,752

[22] Filed: Nov. 14, 1994

[51] Int. Cl.⁶ ..................................................... A47C 7/72
[52] U.S. Cl. ................. 297/180.11; 297/180.12; 5/462; 5/421
[58] Field of Search ............... 297/180.11, 180.12, 297/180.1; 5/462, 421

[56] References Cited

U.S. PATENT DOCUMENTS

| | | | |
|---|---|---|---|
| 2,712,592 | 7/1955 | Goldstein et al. | 297/180.11 X |
| 2,731,542 | 1/1956 | Daniels | 297/180.11 X |
| 3,136,577 | 6/1964 | Richard | 297/180.12 X |
| 3,621,192 | 11/1971 | Pohler | 297/180.12 X |
| 4,258,706 | 3/1981 | Shank | 297/180.12 X |
| 4,335,725 | 6/1982 | Gildmacher | 297/180.11 X |
| 5,370,439 | 12/1994 | Lowe et al. | 297/180.11 |

FOREIGN PATENT DOCUMENTS

| | | | |
|---|---|---|---|
| 235798 | 9/1987 | European Pat. Off. | 297/180.12 |
| 8501482 | 4/1985 | WIPO | 297/180.12 |

Primary Examiner—Laurie K. Cranmer
Attorney, Agent, or Firm—Stanley J. Yavner

[57] ABSTRACT

This device presents a portable seat design, suitable for use in home, automobile, boat, or the like, wherein both the back and the seat portion of the portable seat have embedded therein a heating element for powering by DC in a boat or automobile and by AC in a home. Separate theremostats are provided for the back and seat portion and the powering can be switchable from AC to DC, and the reverse, by using an AC/DC converter switch. The heating elements themselves are embedded or inserted to a rubber or plastic material such as styrofoam, enveloped by a waterproof rubber or plastic, which in turn is surrounded by a flexible plastic cushion material, and then a fabric material. Provisions are made for attaching the back and/or seat portions to an automobile seat or a chair in the home.

1 Claim, 2 Drawing Sheets

PORTABLE HEATED SEAT

FIELD OF THE INVENTION

This invention relates to portable seats, and more particularly to such seats which include heating elements, responsive to on/off switches, thermostatic control and use in a home or an automobile.

BACKGROUND OF THE INVENTION

It has been common for many years to supply in the automobile aftermarket what is commonly known as a seat pad, wherein a back and a seat portion are supported by a fold line, covered with a relatively comfortable fabric and further includes springs, ventilation spaces and the like for presenting a more comfortable cushion, or an additional cushion than that supplied with the automobile. Such aftermarket automobile seats or cushions are intended in some cases to negate the effects of summertime heat and wintertime cold on the driver of the automobile as he enters the automobile after a couple of hours of parking.

Of course, home cushions of similar types have also been provided for use on chairs in the home. Other than therapeutic heating pads for home use, such cushions did not provide the capability for full and integral heating of the seat and back of the user, which was a disadvantage in terms of convenience. More importantly, such items for home use could not provide a portable feature, making the item also usable without significant conversion to automobile or boat use.

As to therapeutic heating pads, they are not designed so that one can sit on them.

OBJECTS AND SUMMARY OF THE INVENTION

Accordingly, a primary object of the present invention is to provide a portable and heated seat, both with respect to its back and seat portion, usable in both the home and an automobile or boat.

A further object of the present invention is to provide a thermostatically controlled, heated and portable seat unit, having both a heated back and a heated seat portion.

A further and more particular object of the present invention is to provide a heated seat for home and automobile use, with a convenient convertor between AC and DC power.

A still further object of the present invention is to provide a heated seat portion attached to a heated back of a portable seat wherein the back and the seat portion are separately operable.

These and other objects of the present invention are provided in a heated portable seat which features an integral construction, with the seat portion foldably connected to the back of the seat, and with each having heating units therein, separately controllable and operable, for use by power from AC or DC plug-in connections. The seat is provided with either interchangeable or conversion capability by means of a convertor, for use with AC and DC electricity. Furthermore, appropriate switches are provided for multiple usage ranges, such as "off" "low" and "high". The heating elements embedded or inserted in both the seat portion and the back are separably operable and controllable by separate thermostats, with such heating elements embedded in a rubber or plastic such as styrofoam, in either event sandwiched to waterproof and insulate the heating elements. Such rubber or plastic, units for holding the heating elements are, in turn, enveloped by, first fabric and then rubber or plastic waterproof and insulating encasements, which in turn are further enveloped in plastic, relatively comfortable, porous cushions, surrounded by a seat fabric, or the like. The back and/or seat portions of the seat are provided with ties or loops to secure them to chairs in the home or automobile seats. Appropriate fuses or other safety connections are also provided, as appropriate. The seat is reversible.

BRIEF DESCRIPTION OF THE DRAWINGS

Other objects, features and advantages of the present invention are shown and provided in the following detailed description of a preferred, but nonetheless illustrative, embodiment, with reference to the accompanying drawings wherein.

DETAILED DESCRIPTION OF THE PREFERRED EMBODIMENT

Figure 1:
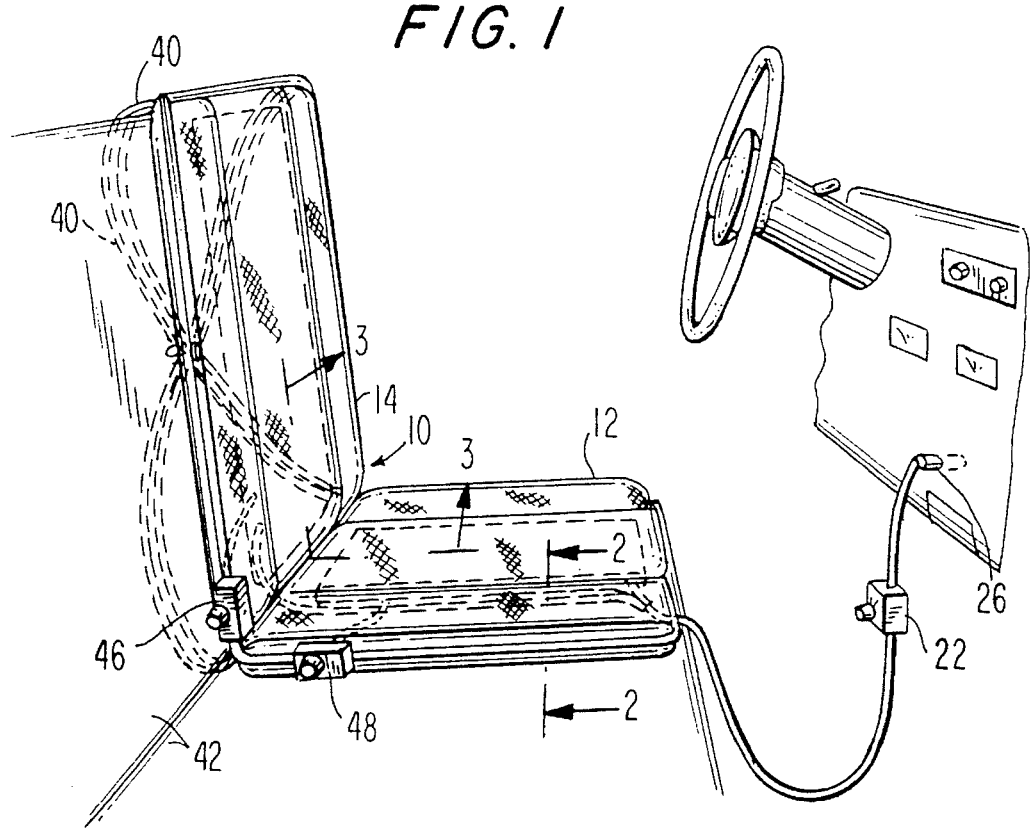
FIG. 1 a perspective view of the present invention in place for use on the seat of an automobile, with a cigarette-lighter connection in the dashboard thereof.

Referring to the drawings, heated and portable seat item, generally designated 10, features an integral construction of seat portion 12 and back portion 14, connected at fold portion 16. Each of back portion 14 and seat portion 12 have embedded therein heating elements 18, 20, respectively. The heating units 18, 20 are separately controllable and operable by means of switch/convertor 22 (shown particularly in FIGS. 1, 4). In more detail, wiring is provided, fully within the capability of those presently skilled in the electrical connection arts, so that the switch 22 converts from AC to DC (and in a reverse direction) in order to accommodate both AC power and plug 24, and DC power and plug 26. In other words, plug-in wiring with an appropriate plug (24, 26) is used along with a conversion capability in switch/convertor 22. Additionally, appropriate wiring and switching are provided, within the capability of those of ordinary skill in the art, so that, by use of switch 22, various ranges of heating are provided separately to back portion 14 and seat portion 12. In other words, switch 22, in addition to converting AC to DC and the reverse, provides an "on" and "off" capability for each of the seat portion and the back portion, with the on capability including low and high ranges. Separate manual switches (not shown) are provided within switch/convertor unit 22 for this purpose, if necessary and convenient.

Figure 2:
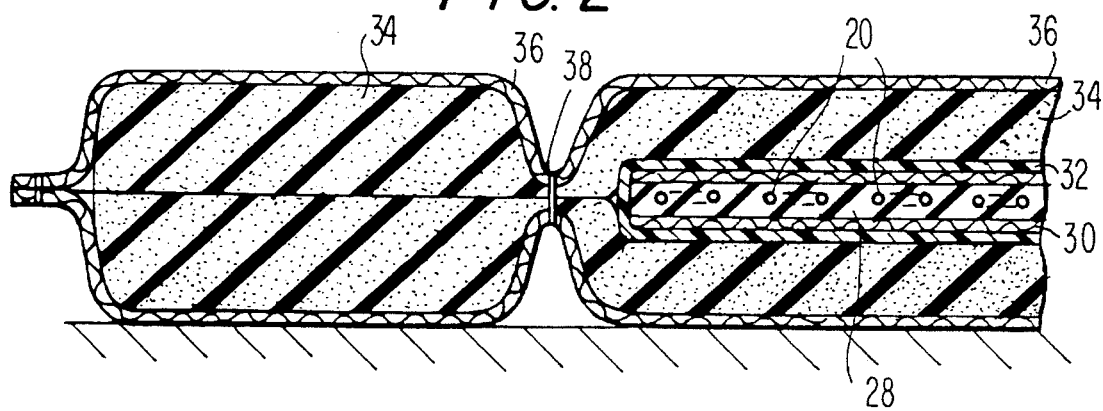
FIG. 2 is a front, sectional view taken along the line 2—2 of FIG. 1, and through a part of the seat portion of the present invention, showing particularly the contour of the outside fabric, and more importantly, the sandwiching of a heating element therein, with appropriate materials surrounding the heating element.
Figure 3:
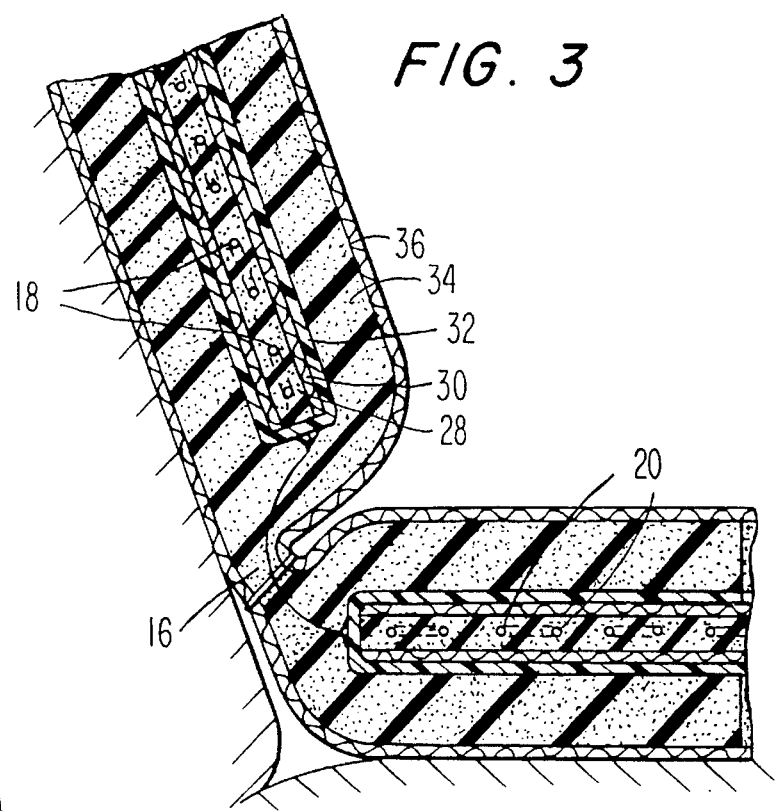
FIG. 3 is a side, sectional view, taken along the line 3—3 of FIG. 1, and showing the integral connection between back and seat portion, as well as the electrical connection and embedding of the heating elements therein.

In both the seat portion and the back portion, (see particularly FIGS. 2 and 3), the heating element, is embedded or inserted in soft and flexible plastic or rubber 28. Using the insertion option, such plastic or rubber 28 defines cavities therein into which heating elements 18, 20 are inserted. The criteria for such soft plastic or rubber 28, includes porosity, as well as electrical insulation capability. Material 28 is, in turn, surrounded by soft fabric 30, or the like in order to enhance the cushioning effect. Fabric 30 is, in turn, surrounded by a thin plastic sheet 32, which essentially provides waterproofing for heating elements 18, 20. Sheet 32 is surrounded by a porous, cushioning plastic or rubber material 34, which is enveloped by outside fabric 36. The contour 38 of outside fabric 36 is particularly illustrated in FIG. 2, which enables a greater comfort for the user.

Figure 4:
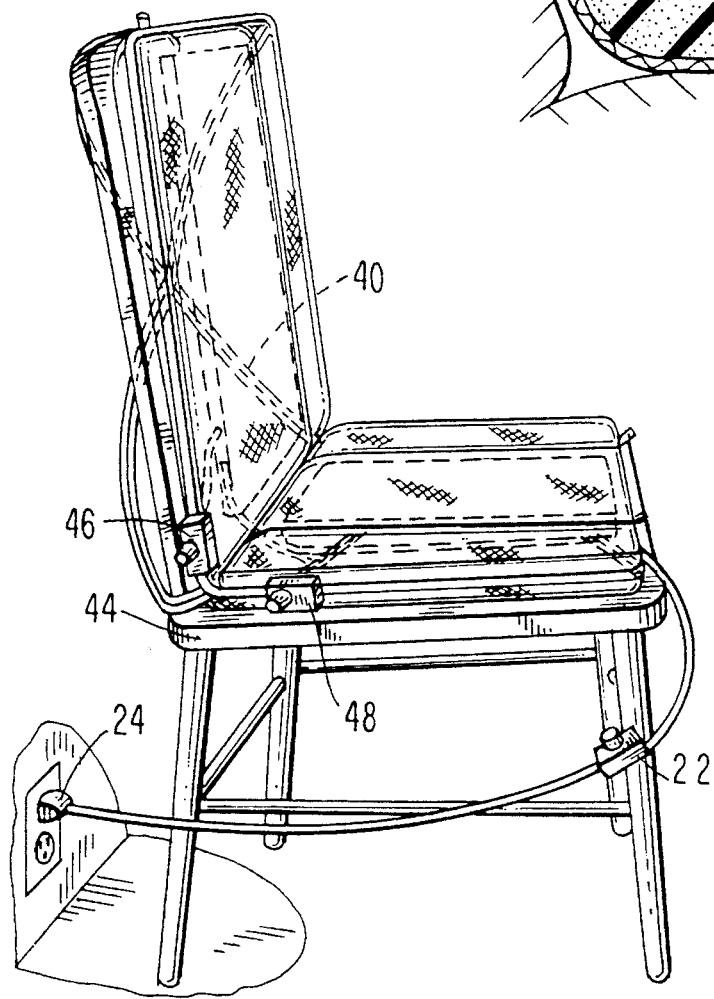
FIG. 4 is a perspective view showing use of the present invention on a chair in the home, with appropriate connection to AC current.

Referring particularly to FIGS. 1 and 4, it may be seen that elastic bands 40 are used to attach the portable seat of this invention to either automobile seats 42 or chairs 44, as are commonly found in the home.

Separate thermostats 46, 48 are peripherally placed with respect to the back portion 14 and the side portion 12, respectively, in order to enable further control of heating during usage.

In order to provide a more complete understanding of the structure and use of the present invention, a series of use and operating steps are now provided. When the user determines that his or her usage of the invention in the home environment is temporarily to be changed to use in his or her automobile, the elastic bands 40 are removed from around chair 44 (FIG. 4) and placed around car seat 42. Plug 24 and its wire are removed from switch/convertor 22, and replaced with plug 26 for the automobile cigarette-lighter receptacle and its wire, and switch/convertor 22 is moved to the position for converting to DC power. Appropriate heating levels are chosen by manually switching the switches for that purpose in switch/convertor 22. Lastly, the thermostats 46, 48 in the unit are appropriately set, between the adjustment points provided for that purpose, and comfort and convenience to avoid cold and other discomfort are quickly achieved.

The foregoing description shows the preferred embodiment of the present invention for purposes of completely explaining the various facets thereof; nevertheless, the limits to the present invention are to be provided only by the following claims:

What is claimed is:

1. A portable heated seat for use in a home and in a vehicle comprises a back portion and a seat portion, a fold portion connecting said back portion and said seat portion, a heating element within each of said back and seat portions, a connection for connecting said heating elements to enable flow of current thereto, means for waterproofing said heating elements including a sheet between said materials, provided for protecting said elements against moisture effects, means for cushioning said seat and for protecting said elements and control means for controlling said flow to said heating elements, wherein porous, soft first material is provided for holding said elements, porous, soft second material is provided for encircling said first material, and wherein an inner fabric is provided between said sheet and said first material.

* * * * *